(No Model.)
J. E. WELCH & A. B. BOWMAN.
Coffee Pot.
No. 237,352.   Patented Feb. 1, 1881.
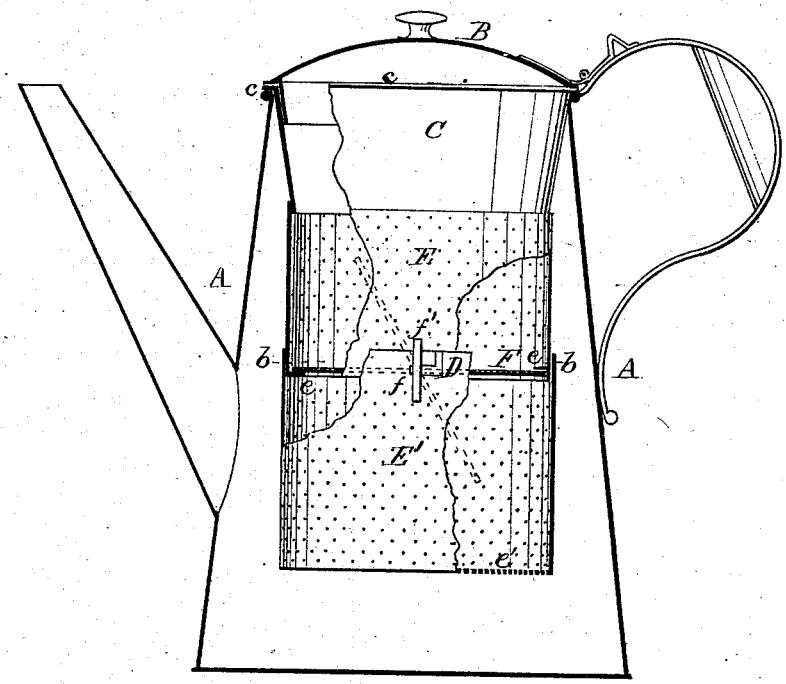
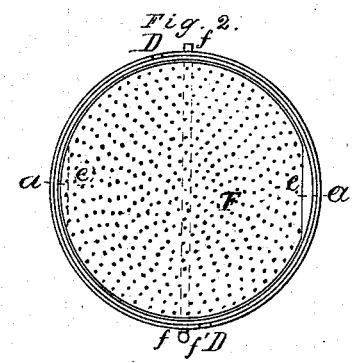
Witnesses:
Geo. H. Knight
Walter Allen
Inventors:
James E. Welch
Albert B. Bowman
By Knight Bros.
Attys.

UNITED STATES PATENT OFFICE.

JAMES E. WELCH, OF PETERSBURG, ILLINOIS, AND ALBERT B. BOWMAN, OF ST. LOUIS, MISSOURI.

COFFEE-POT.

SPECIFICATION forming part of Letters Patent No. 237,352, dated February 1, 1881.

Application filed July 9, 1880. (No model.)

*To all whom it may concern:*

Be it known that we, JAMES E. WELCH and ALBERT B. BOWMAN, residing at Petersburg, Menard county, Illinois, and city of St. Louis, Missouri, respectively, have invented Improvements in Coffee-Pots, of which the following is a specification.

The nature of our invention consists in the peculiar construction and arrangement of the parts hereinafter fully set forth and claimed.

In the drawings, Figure 1 is a side view of the improvement with parts broken away, showing the percolator in such places in section at $a\ a$, Fig. 2. Fig. 2 is a horizontal section of the percolator at $b\ b$, Fig. 1.

A A represent a coffee-pot made in the usual manner and provided with a top, B, fitting on the holder or receptacle C, which is simply an open-topped cylinder flaring outwardly toward the top and provided with a rim, $c$, which rests upon the top of the coffee-pot and sustains the holder. The lower end of the holder is firmly soldered to the upper percolator, E, which is a perforated cylinder open at both ends, and within which, at the lower end, is the perforated disk-valve F, supported on axes $f\ f$, and which may be revolved by means of cross-bar $f'$, one side of said disk F resting, when revolved, alternately upon the lips $e\ e$, which are attached to the inside of the upper percolator, E.

E' is the lower percolator, consisting of a perforated cylinder open at top and having a perforated bottom, $e'$, and is attached to the upper percolator, E, by a bayonet-joint, D D, and thus securely held in position.

All the parts of our invention may readily be detached from the coffee-pot to be cleaned, &c.

In use the coffee is placed in the upper percolator, E, the valve F being placed in the proper position to prevent its falling through into the lower percolator, and the water poured into the receptacle D and percolated through the coffee in the percolator E, escaping through the sides of the same, and through the valve F, into the lower percolator, E'.

When it is necessary to add more coffee the valve F is turned over, allowing the grounds that have been steeped to fall into the lower percolator, E', and the fresh coffee is placed in the upper percolator. The coffee, after having been resteeped in the lower percolator, may be removed by detaching the lower percolator; then, after the percolator is again replaced, the fresher coffee from the upper percolator can, in turn, be emptied into the lower one by turning the valve F. (See dotted lines, Fig. 1.)

We are fully aware that it is not new to suspend a perforated coffee-receptacle within a coffee-pot, and so do not claim the same, broadly, as our invention; but

What we claim as new, and of our invention, is—

1. The combination of coffee-pot A and percolator, consisting of two separable parts, E and E', with valve F between them, substantially as set forth.

2. The combination of coffee-pot A, holder C, formed with a rim or flange, $c$, perforated jointed percolator E E', provided with a valve, F, one or more lips, $e\ e$, and cross-bar $f'$, all arranged substantially as and for the purpose set forth.

3. The combination, with a coffee-pot, of the holder C, formed with an external flange at its top, and attached to a perforated percolator at its bottom, said percolator being provided with a valve, F, resting, when in position, upon the lips $e\ e$, and which may be revolved by turning the cross-bar $f$, which forms part of the bayonet-joint D, and which has a lower perforated percolator, E', suspended therefrom, all constructed and arranged substantially as herein described.

JAMES E. WELCH.
ALBERT B. BOWMAN.

Witnesses to signature of James E. Welch:
CHARLES CARMON, Jr.,
T. S. KNOLES.

Witnesses to signature of Albert B. Bowman:
SAML. KNIGHT,
GEO. H. KNIGHT.